United States Patent
O'Hanlon

(10) Patent No.: US 9,038,887 B1
(45) Date of Patent: May 26, 2015

(54) SYSTEM FOR RESPONDING TO QR CODES, SHOTCODES, MOBITAGS, 2-DIMENSIONAL BAR CODES, 3-DIMENSIONAL BAR CODES, AND IMAGES

(75) Inventor: Kenneth O'Hanlon, Abingdon (GB)

(73) Assignee: O'Hanlon Ltd, Wantage, Oxfordshire (GB)

( * ) Notice: Subject to any disclaimer, the term of this patent is extended or adjusted under 35 U.S.C. 154(b) by 199 days.

(21) Appl. No.: 13/536,847

(22) Filed: Jun. 28, 2012

Related U.S. Application Data

(60) Provisional application No. 61/501,920, filed on Jun. 28, 2011.

(51) Int. Cl.
- *G06K 7/00* (2006.01)
- *G06F 17/00* (2006.01)
- *G06Q 30/00* (2012.01)
- *G06Q 20/02* (2012.01)

(52) U.S. Cl.
CPC ..................................... *G06Q 20/02* (2013.01)

(58) Field of Classification Search
CPC ................. G06F 17/30879; G06F 17/30867; G06Q 20/02
USPC ........ 235/375, 435, 462.01–462.49; 705/14.4
See application file for complete search history.

(56) References Cited

U.S. PATENT DOCUMENTS

| | | | |
|---|---|---|---|
| 8,027,998 B2 | 9/2011 | Uehori et al. | |
| 8,249,965 B2 | 8/2012 | Tumminaro | |
| 8,599,836 B2 | 12/2013 | Van Buren et al. | |
| 2004/0240642 A1 | 12/2004 | Crandell | |
| 2007/0155489 A1 | 7/2007 | Beckley et al. | |
| 2007/0288543 A1* | 12/2007 | Evans et al. | 709/200 |
| 2008/0114649 A1* | 5/2008 | Swirsky et al. | 705/14 |
| 2009/0254633 A1 | 10/2009 | Olive | |
| 2009/0307232 A1* | 12/2009 | Hall | 707/10 |
| 2010/0306053 A1 | 12/2010 | Martin et al. | |
| 2011/0182283 A1 | 7/2011 | Van Buren et al. | |
| 2011/0184799 A1 | 7/2011 | Henderson et al. | |
| 2011/0320347 A1 | 12/2011 | Tumminaro | |
| 2012/0238353 A1 | 9/2012 | Herrmann et al. | |
| 2013/0073400 A1 | 3/2013 | Heath | |

* cited by examiner

*Primary Examiner* — Michael G Lee
*Assistant Examiner* — Laura Gudorf

(57) ABSTRACT

System, including a code scanner, for using multi-function codes, such as multi-function QR codes, MobiTags, Shot-Codes, 2-dimensional bar codes, 3-dimensional bar codes, or images to open multiple ports of a telephone device. One of the ports is a text port, enabling the system to obtain the telephone number of a device that reads a code associated with an item and then generate a lead for follow-up by an agent. The lead is sent to the agent via a text or email message. The system may also pass the lead to other agents if the first agent doesn't respond, and it may also send additional information to the telephone device. The system may include a database of item-associated information and the capability of accessing the item-associated information for inclusion in outgoing messages to the agents and/or the telephone device.

19 Claims, 8 Drawing Sheets

US 9,038,887 B1

SYSTEM FOR RESPONDING TO QR CODES, SHOTCODES, MOBITAGS, 2-DIMENSIONAL BAR CODES, 3-DIMENSIONAL BAR CODES, AND IMAGES

FIELD OF THE INVENTION

The present invention relates generally to system for providing and responding to codes that are readable with a digital telephonic device, and more particularly to a system for generating and responding to QR codes, ShotCodes, MobiTags, 2-dimensional bar codes, 3-dimensional bar codes, images, and video.

CROSS REFERENCE TO RELATED APPLICATIONS

This application is a continuation-in-part of U.S. provisional application No. 61/501,920, filed on Jun. 28, 2011, in the name of the same inventor and having the title, "QR Code Response System," the entire disclosures of which is incorporated herein by this reference.

BACKGROUND OF THE INVENTION

Quick Response codes or "QR codes" are used increasingly for conveying information, particularly in advertising. QR codes are 2-dimensional matrices of black and white squares that function as a two-dimensional bar code, developed to allow high-speed decoding. They can be read by a variety of decoding devices, including dedicated QR code readers and many smart phones provided with QR code reader applications. Originally developed for tracking parts during vehicle manufacturing, QR codes may be used for other purposes, including conveying information to the reading device user. QR code generators are readily available to those who want to generate and print their own codes, and there is a published ISO standard for QR codes.

Other types of codes perform similar functions. MobiTags were developed by Microsoft and do essentially the same thing as QR Codes but use color. ShotCodes were developed in England by the University of Cambridge and can be scanned by a camera phone without requiring a downloaded app for decoding the image and viewing an encoded mobile web page. A ShotCode consists of data circles surrounding a center point. ShotCodes store a look up number consisting of 49 bits of data. A central server decodes the look up number, which is linked to a URL, and sends the URL back to the scanner. (http://www.shotcodes.com/) 2-dimensional and 3-dimensional bar codes may be used in a similar manner.

Increasingly, QR codes, MobiTags, and ShotCodes are being used as a means of communicating with mobile phone users, with links to internet addresses and/or Uniform Resource Locators (URLs) provided in the codes. Code displays are presented in magazines, or on signs, buses, business cards, or almost any object about which a code publisher believes users might need or want information. Users with a camera phone in the case of a ShotCode, or a smart phone in all other cases, equipped with the correct reader application can scan the image of the bar code or QR code to receive a URL that will open a mobile web page that displays the content that has been uploaded to the mobile web page, including a link to a text display, an email message, Vcard contact information, or a link to connect to a wireless network or to open a web page in the telephone or digital mobile device's browser.

QR codes, MobiTags, and 2D bar codes are becoming a popular means of advertising, allowing the advertiser to disseminate a code that provides information to anyone who uses their mobile phone or other reading device to read the code. The advertiser's outgoing message associated with the code can be changed easily, without having to change the code, making the use of the code inexpensive and efficient for the advertiser.

As shown in FIG. 1, a provider may present a QR code 100 at a location that allows the code to be scanned, for example, on a shelf, on an item, on a billboard, on a coupon, or on a magazine page. When a user's reader scans the code, a single-function link 104 to the provider's URL 102 is sent to the reader. The user can push a button on the reader to open the link and establish a connection, such as wireless application protocol (WAP) page 106 or a WAP locating product or service 108 for determining the reader location via GPS or triangulation.

To date, tracking and usage analytics of QR codes have been limited to providing information on the identification and the IP address of the device that reads the code. This information is used to geo-locate the device, letting the tracker know where the reader device is located, but not specifically who the user is. For user identification, the user must complete a form that appears as part of the mobile web page returned to the reader or respond to questions provided in an email or text message. Such user responses can be used in numerous ways, including:

- re-using user data, so that the user only has to complete the form once;
- limiting the number of times a user can enter a contest or respond to an offer provided via the QR code; or
- providing an offer for products or services.

While these uses may include incentives for the user to respond, they cannot generate leads for subsequent contacts if the user doesn't complete the form. The large majority of users does not respond to the forms.

At present, only "smart phones" with QR code reader apps or other QR code reading devices can be used to scan a QR code and access the provider's URL. Such smart phones with the capability of using downloaded apps, such as a QR code reading app, currently account for close to one half of the mobile telephone devices in use. Many more camera phones are in use, able to record images and ShotCodes but unable to receive and use downloadable apps.

Thus, there is a need for a system that can automatically collect user-specific contact information from devices that read and respond to QR codes, ShotCodes, read QR codes and/or bar codes and then use that information for identifying users and, optionally, subsequently contacting the users. There is an additional need for a system that can provide access to code providers' URLs using an image of a code, an image of an item associated with the code, or video of the item. There is a further need for a system that can facilitate prompt responses to users who access the system by reading a QR code, ShotCode, and/or bar code. In addition, there is a need for a system that can automatically recognize images and collect user-specific contact information from devices that provide the images and, optionally, subsequently contact the users. There is an additional need for a system that can provide access to URLs using an image of an object, which may be a photographic image, QR code, ShotCode, or bar code. There is a further need for a system that can facilitate prompt responses to users who access the system by reading a QR code, ShotCodes, read QR codes and/or bar codes.

SUMMARY

To achieve the foregoing and other objects and in accordance with the purpose of the present invention broadly described herein, one embodiment of this invention comprises a system for responding to codes scanned by a reader. The reader has multiple communication ports, including a telephone port with an associated telephone number. The system comprises a code associated with an item and recognizable by the reader; a URL associated with a provider of the code and item, wherein the URL is accessible via the code; a multifunctional link that is operative to interact with the URL and to open the telephone port and at least one additional communication port of the reader when the link is accessed by the reader; a platform that is operative to receive information from the communication ports, the information including the telephone number of the reader, the platform also being operative to transmit information to the reader; and a lead router that receives communications from the platform and routes the information to the provider, wherein the information includes the associated telephone number.

The information transmitted to the reader may comprise links to URLs that include the associated telephone number. The system may further comprise a code generator operative to create the code; a code scanner having a unique identifier associated with the telephone number of the reader; and means for using the identifier to associate the telephone number with one or more features selected from links to URLs, text messages, WAP pages of the reader, and WAP locating functions of the reader. The scanner may be downloadable to the reader and adapted for use with the particular type of reader for recognizing the code. The scanner may operative to retrieve information from images, and the images may be selected from QR codes, ShotCodes, MobiTags, 2-dimensional bar codes, 3-dimensional bar codes, photographic images, and video recordings. The system may comprise a plurality of lead routers for routing the information to a plurality of providers.

Another embodiment of the present invention comprises a method for generating and tracking leads in response to scanned codes. The method comprises the steps of:

a. providing a system comprising a code associated with an item and recognizable by the reader; a URL is associated with a provider of the code and item, wherein the URL is accessible via the code; a multifunctional link that is operative to interact with the URL and to open the telephone port and at least one additional communication port of the reader when the link is accessed by the reader; a platform that is operative to receive information from the communication ports, the information including the telephone number of the reader, the platform also being operative to transmit information to the reader; and a lead router that receives communications from the platform and routes the information to the provider, wherein the information includes the associated telephone number;

b. receiving a communication from the reader that opens the link and the URL;

c. using the multifunctional link to open the telephone port and at least one additional communication port of the reader and to transmit information including the reader telephone number to the platform;

d. using the platform to send return information to the reader, the return information including a link to an additional URL, the additional URL comprising the reader telephone number;

e. receiving via the additional URL a user request transmitted by the reader for information about the item;

f. automatically associating the reader telephone number with the request;

g. sending the requested information to the reader; and h. routing the phone number and additional information about the request to a lead router.

The requested information in step g may be a text message. The requested information in step g may comprise at least one link to a supplemental URL comprising the phone number of the reader, and the method may further comprise the steps of:

i. receiving a user selection from the reader of one of the links to a supplemental URL; and j. routing the phone number and information about the selection to a lead retrieval system.

The lead router may be different from the lead retrieval system of step i.

Yet another embodiment of the present invention comprises a system for associating telephone numbers with text transmissions. The system comprises means for receiving data simultaneously from a telephone port having an associated telephone number and a text port, with both ports in a telecommunications device; means for transmitting data including the telephone number to the text port; and means for transmitting additional data including the telephone number to a tracking system.

The means for receiving data may comprise a multifunctional link operative to keep the telephone port and the text port open simultaneously. The additional data may comprise leads, and the tracking system may be a lead routing system. The system may further comprise a database of information for transmittal to the text port.

Still another embodiment of the present invention comprises a system for handling a code associated with an item, with the code including instructions for providing information about the item. The system comprises means for receiving an image of the code from a data port of a sending/receiving device; means for scanning the image to obtain the instructions; and means for carrying out the instructions; wherein the instructions include the steps of:

opening a telephone port of the sending/receiving device, the telephone port having an associated telephone number;

associating the telephone number with information to be sent to the data port; and transmitting the information to the sending/receiving device.

The means for scanning may operate in the sending/receiving device. In the system, the means for scanning may be a downloadable software application specific for use with the sending/receiving device; the application may associated with an unique identifier; and the means for carrying may comprises means for associating the unique identifier with the telephone number and means for using the unique identifier and the telephone number for formatting the information for the sending/receiving device. The code may be selected from QR codes, ShotCodes, MobiTags, 2-dimensional bar codes, 3-dimensional bar codes, images, video, and combinations thereof. The means for carrying out instructions may comprise a multifunctional link operative to maintain multiple ports of the sending/receiving device open; and/or a platform operative to associate the telephone number with the data; and/or it may be operative to send messages including the telephone number to a message router.

Yet a further embodiment of the invention comprises a system for communicating with an information sending/receiving device, the device having a camera and a unique user identification, the system comprising the steps of:

receiving a message from the sending device and opening an URL, finding the unique user identification of the sending device, determining from the user identification the make and model of the sending device; and formatting messages for receipt by the sending device. The system may further comprise the steps of opening a telephone port of the sending/receiving device to obtain a telephone number associated with the device; and tying the telephone number to the unique user identification.

BRIEF DESCRIPTION OF THE DRAWINGS

These and other features, aspects, and advantages of the present invention will become better understood with reference to the following description, appended claims, and accompanying drawings, where:

DESCRIPTION OF THE PREFERRED EMBODIMENTS

The present invention comprises a system in which multi-function codes are associated with items and made available to users for scanning or imaging. The following discussion describes the use of QR codes as an example, but other types of codes, including ShotCodes, Mobi Tags, 2-dimensional bar codes, 3-dimensional bar codes, images, and video may be used. These codes include means for opening a multifunctional link that is connected to an URL that is associated with the provider and formatted for access from mobile phones. The URL interacts with the multifunctional link to simultaneously open multiple functions of the user's reader to provide information back to the user and to receive information that includes the telephone number associated with the reader. The phone number and related information may then be forwarded automatically to an agent, such as a sales agent, for follow-up contact with the user.

In the following discussion, the term "item" refers to an object or real property with which a code is associated. The term "provider" refers to the party or entity that associates one or more codes with one or more items and makes the code or codes available, such as in an advertisement. The term "reader" refers to any telephone or digital mobile device that can scan the code or obtain an image of the code, including but not limited to dedicated code scanners, smart phones, picture phones, and other portable telephonic devices. The term "user" refers to a person using a reader to scan and respond to the code. The term "agent" refers to a sales agent or other representative of the provider who may use information as described below. The term "WAP" refers to wireless application protocol. In the following discussion, real estate agents, brokers, and real properties are used as examples, but the present invention is not limited to real estate applications and could be used with any type of item and any type of agent. Different figures show the same features with the same call-out numbers.

Figure 1:
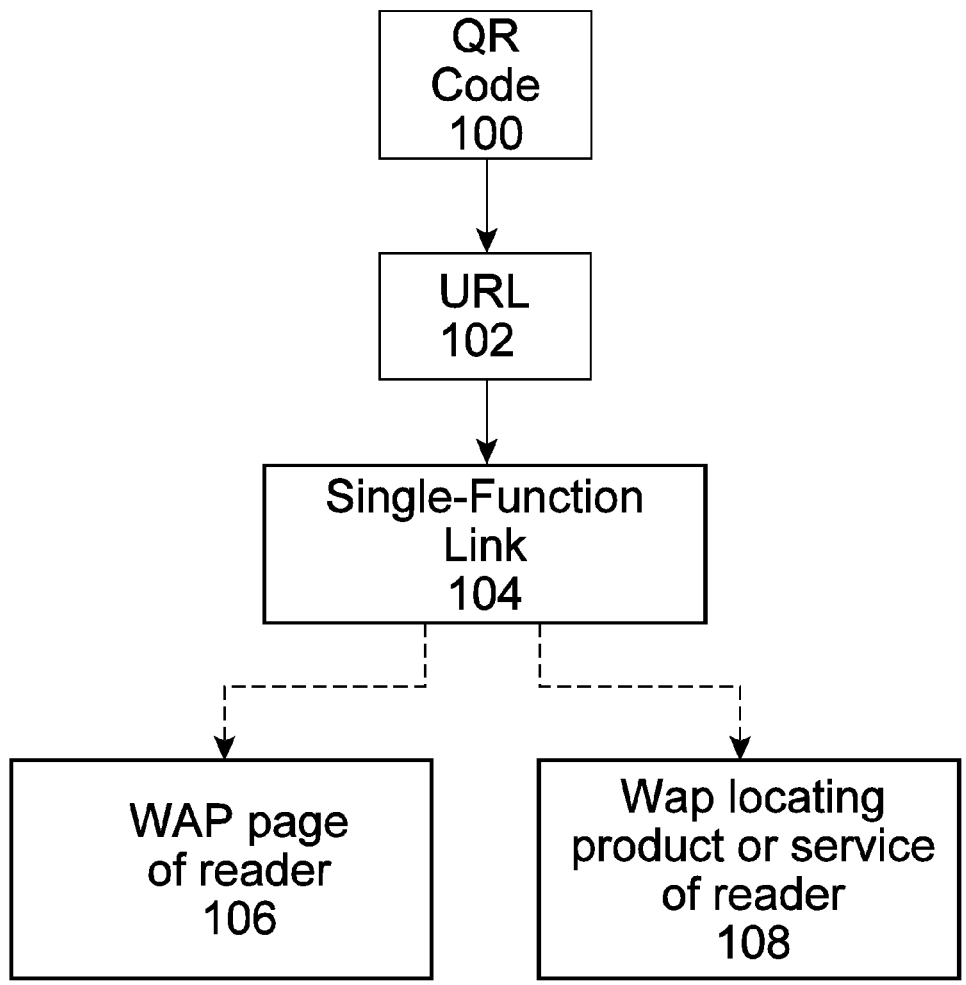
FIG. 1 is a flow chart showing a prior art system for providing information to a user via a prior art QR code.
Figure 2:
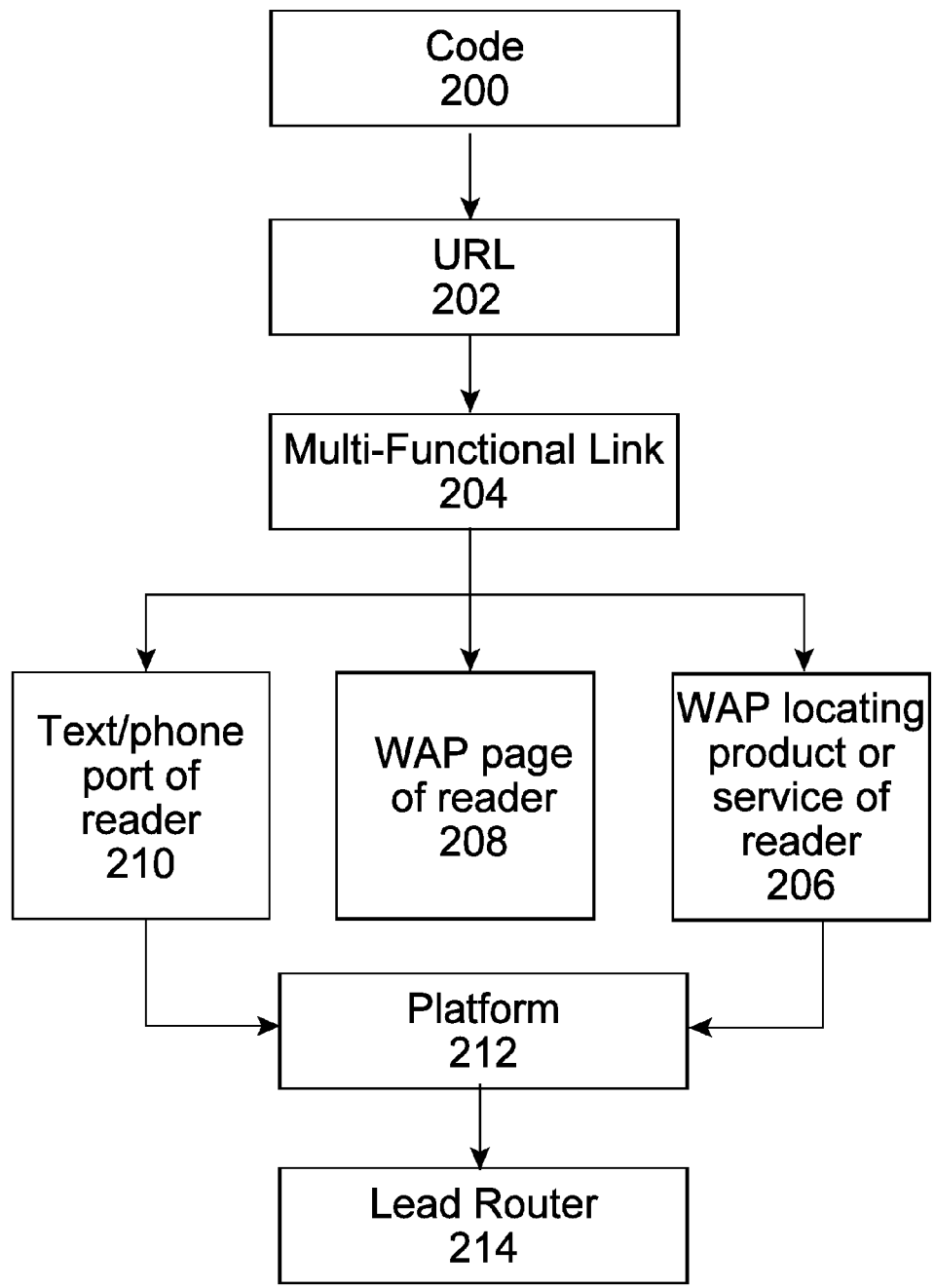
FIG. 2 is a flow chart showing one embodiment of a system in accordance with the present invention using a multi-functional link for providing information to a user via a QR code and using a text portal of a code reading device to capture the phone number associated with the device and route the phone number to a sales agent.

Referring to FIG. 2, one embodiment of the present invention comprises a code 200, such as a QR code, that includes instructions for opening multiple ports in a reader when the code is scanned or when a photograph or facsimile image of the code is presented to the provider's URL 202. The code may be presented on a shelf where items are placed, on an item, in an advertisement or announcement, or anywhere where it can be scanned or imaged. Alternatively, the item itself can function as a "code," with the item or an image of the item available for photographing or shooting video. The code may be displayed with additional information for the user, such as in an advertisement. Although the code 200 of the present invention may appear superficially like a standard, prior art code, such as a QR code, ShotCode, MobiTag, or bar code, it includes encoded instructions for opening multiple ports in the reader and must be created with a specialized code generator. The system that receives a message from a reader must be able to handle communications involving multiple ports simultaneously.

Figure 3:
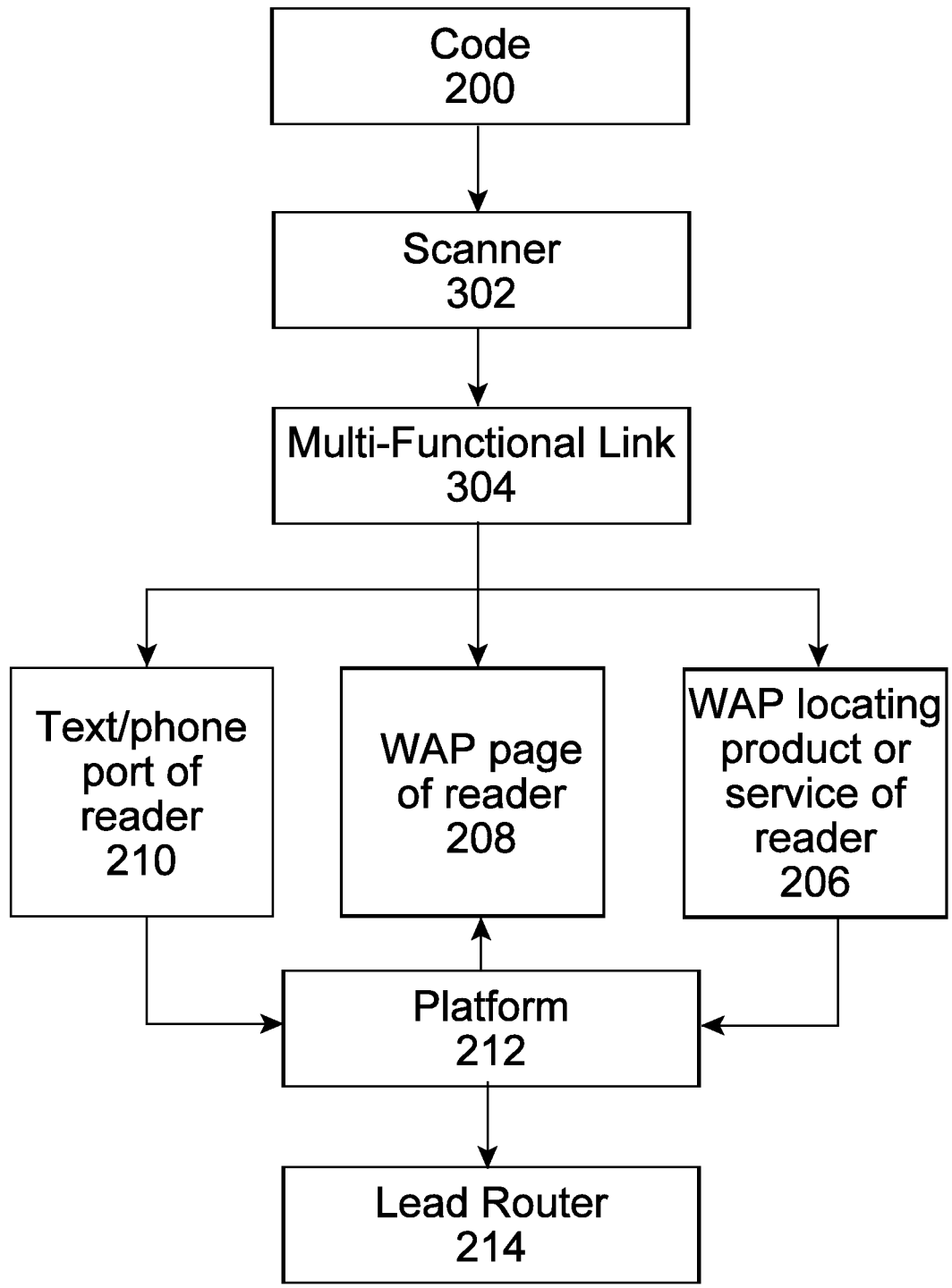
FIG. 3 is a flow chart showing another embodiment of a system in accordance with the present invention using a multi-functional link for providing information to a user via a QR code and using a text portal of a code reading device to capture the phone number associated with the device and route the phone number to a sales agent.

Alternatively, as shown in FIG. 3, the code may be processed by a scanner 302 that opens multi-functional link 304, which may operate with or include a URL, such as URL 202.

Some mobile phones currently in use have cameras that record video and still images having sizes ranging from 3 to 12 megapixels, with new devices expected to come onto the market capable of recording even larger size images. Thus, to ensure compatibility with the different devices, a variety of image scanners are provided for downloading. The downloaded scanner can open the link 204 for communication with the platform 212. When a user requests a code reader for downloading onto his or her reader, a link is provided for a downloadable application including a scanner that is suitable or preferable for his or her mobile device. The scanner may include an embedded video player/recorder as well as the ability to process still images, particularly if the reader is capable of recording video. To provide for automatic association of the reader phone number with internet communications and links, as described below, a unique identifier is attached to each downloaded scanner application.

Multi-functional link 204 operates with a variety readers and is opened when the user's reader scans or presents an image of QR code 200. Multi-functional link 204 preferably also includes a scanner with the capability of handling still images as well as playing and recording video. Thus, the system can respond when a code is read by a reader and, if the reader does not provide a scanned code, to respond to a photograph, video, or other image, including an image of a code such as a QR code and recognize the item. After the code is scanned, either by the user's reader or by the scanner associated with 204, link 204 proceeds to open the desired communication ports on the reader. These ports may include a WAP page 206 on a mobile device; a WAP locating product or service 208, such as might be used for location via GPS or triangulation; a telephone communication port 210, such as is used for text messaging and normal telephone calls; and/or any other data port of the reader (not shown). The scanner associated with link 204 can recognize the type of reader that sent the message, whether the message was sent via a downloaded scanner or was scanned by the scanner associated with the link 204. Regardless of the scanner location, it opens the link 204, enabling the platform 212 to stream video both to and from the reader, for example, of a house, without requiring the user to make another click. If the reader is not a smart phone or for some other reason does not use a downloaded scanner, the platform can send a text message with an imbedded video player to the WAP page of the reader.

Regardless of whether the scanner has been downloaded onto the reader or is located in link 204, after the code is scanned, the telephone number remains associated with data ports other than the telephone communication port, enabling tracking of the user's device as described below.

Figure 4:
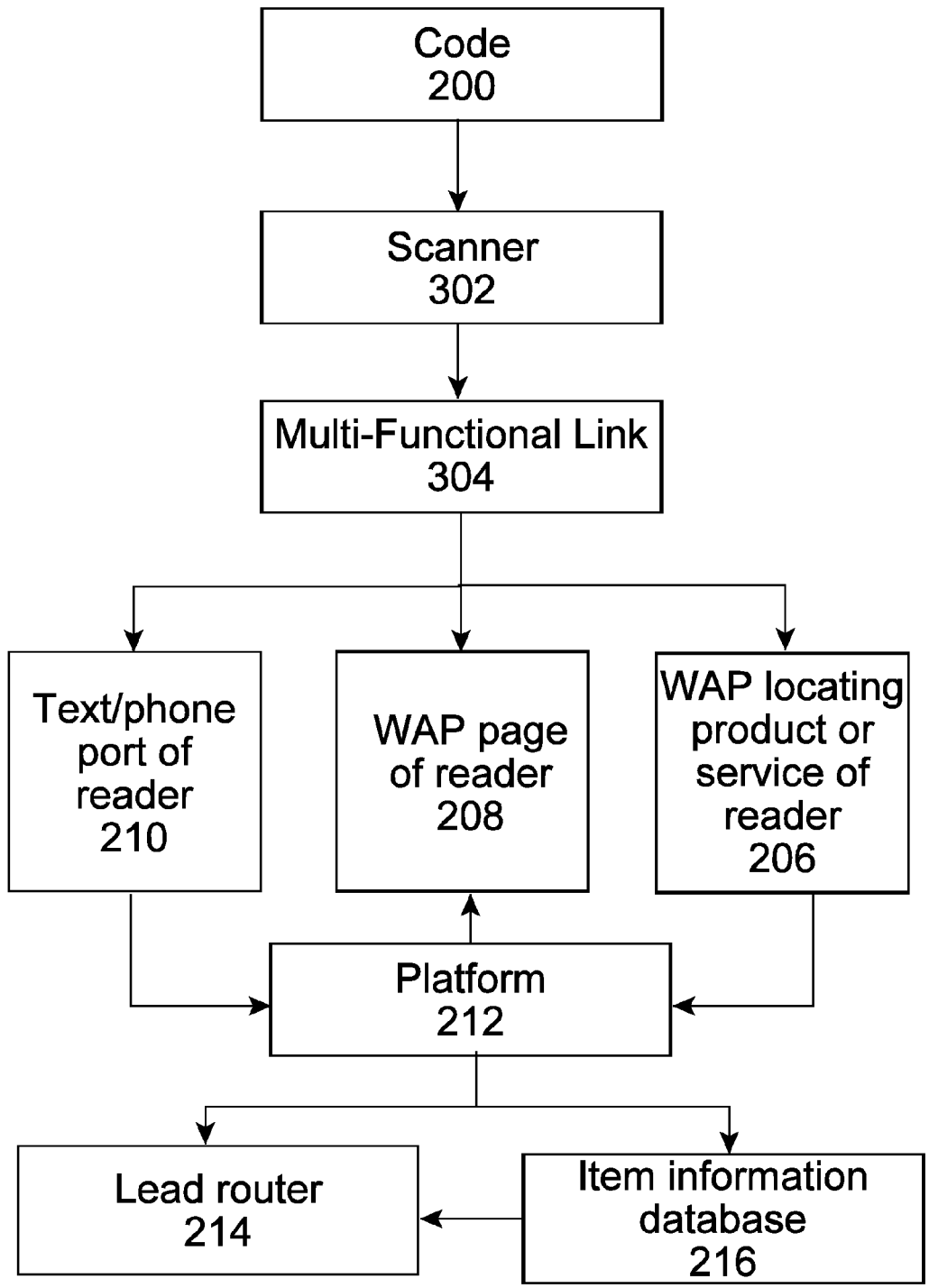
FIG. 4 is a flow chart showing a system in accordance with the present invention using a multi-functional link for providing information to a user via a QR code and using a text portal of a code reading device to capture the phone number associated with the device and place the phone number and associated information in a captured lead database for subsequent use by a sales agent.

When link 204 receives an incoming message responding to a code 200, it opens the URL 202 to the provider's mobile web page for the specific content, for example in the case of real estate, property information with URL links for photos and videos. Link 204 also uses the text port of the reader to send a text message to platform 212. This text message includes the telephone number of the reader, as occurs whenever a text message is sent. In addition, other information may be sent, such as the location of the reader and information about the item with which the QR code 200 is associated. Platform 212 sends the information to lead router 214. As shown in FIG. 4, platform 212 may also identify information in a database 216 and send that information to lead router 214, such as a URL link to a description of the item. One example of a suitable platform is one that incorporates the services offered by mVerso Ltd, www.mverso.co.uk.

Figure 5:
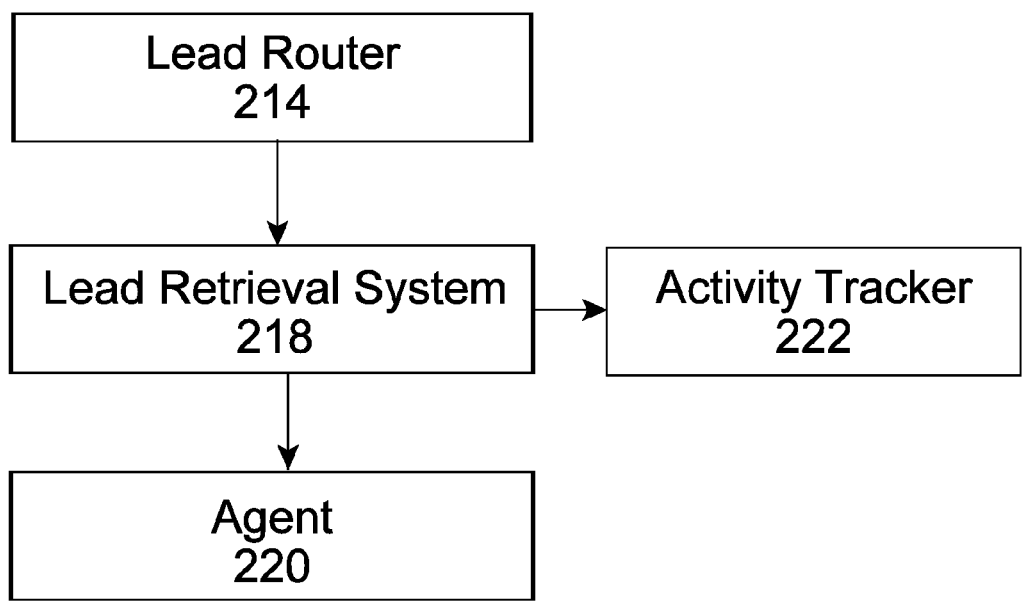
FIG. 5 is a flow chart showing one embodiment of how captured phone numbers can be forwarded to agents.

As shown in FIG. 5, the lead router 214 communicates with a lead retrieval system 218, which may then send a text message, email, and/or other notification to an agent 220, letting the agent 220 know that he or she has a lead, i.e., the user who is interested in the item. The message may include relevant information about the lead/user and the item, such as a reference number associated with the item; the date and time the code associated with the item was scanned, a call was received from the caller, a text message was received with an image of the code, an image of the item was received, or video of the item was received; the phone number of the reader from which the contact originated; and a URL link to additional information about the item in database 216. Preferably, the message contains no more than 140 characters to conform to an industry standard for text messages. The agent 220 can then follow up with a telephone call to the user. Optionally, the lead retrieval system 218 may be connected to an activity tracker 222 that records information about agent contacts.

For example, the text message could say, "A lead is waiting for you! Call 555-555-5555, enter reference number xx. Click the link to review the item details." The phone number 555-555-5555 is a phone number of the system, allowing the system to track when the agent responds. The reference number xx identifies the phone number of the lead, allowing the agent's call to be forwarded to the lead (user).

The lead retrieval system 218 may also provide the IP address and GPS location of the reader to a third party to enable the user to search additional information without having to navigate to a different web browser on their reader. Additional search criteria may appear in an initial URL link that would open up to another mobile web page with a survey type form that users could complete to narrow their search even further, such as to a category of location-related information. For example, in the case where the QR code is associated with real estate, search categories might include additional properties available in the area, churches, tax information, schools, coffee houses, mortgage providers, home inspectors, etc.

Figure 6:
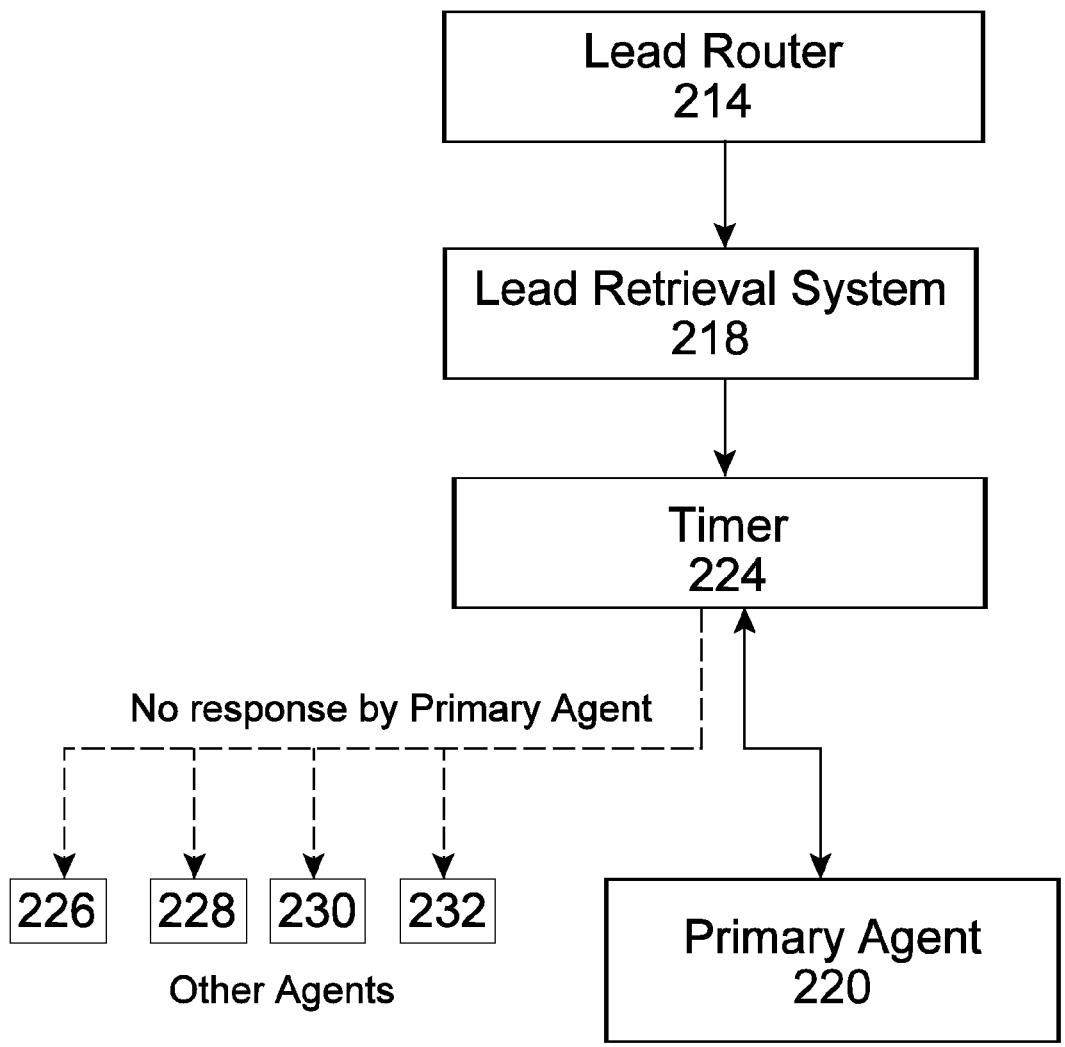
FIG. 6 is a flow chart showing another embodiment of how captured phone numbers can be forwarded to agents.

If there are multiple agents who can potentially respond to the lead, it may be desirable to use a lead retrieval system that includes or is tied to a timer 224 to send the message first to a primary agent 220 and, if the primary agent doesn't respond within a predetermined period of time, to then send the message to one or more additional agents. For example, the item could be a real estate property for sale, and the primary agent could be a realtor who has the listing for the item. As shown in FIG. 6, the lead retrieval system 218 may send a text or email message with information about the lead through timer 224 that tracks the time elapsed after the message is sent to the primary agent 220 and whether the primary agent responds. If the primary agent 220 does not respond within a predetermined period of time, then the message is sent to an additional agent or sent simultaneously to more than one additional agents. For example, if the primary agent 220 is one of several agents in a real estate office, the message could be sent to all or some of the other agents in the office. The information available through the URL link to the item in database 216 may allow an additional agent 226, 228, 230, or 232 who wants to respond to the lead to know enough about the property to follow up effectively with the lead. If the real estate company handling the property tracks agent activities, the first agent to call in to receive the lead cell phone number is the sales agent of record for that lead.

Figure 7:
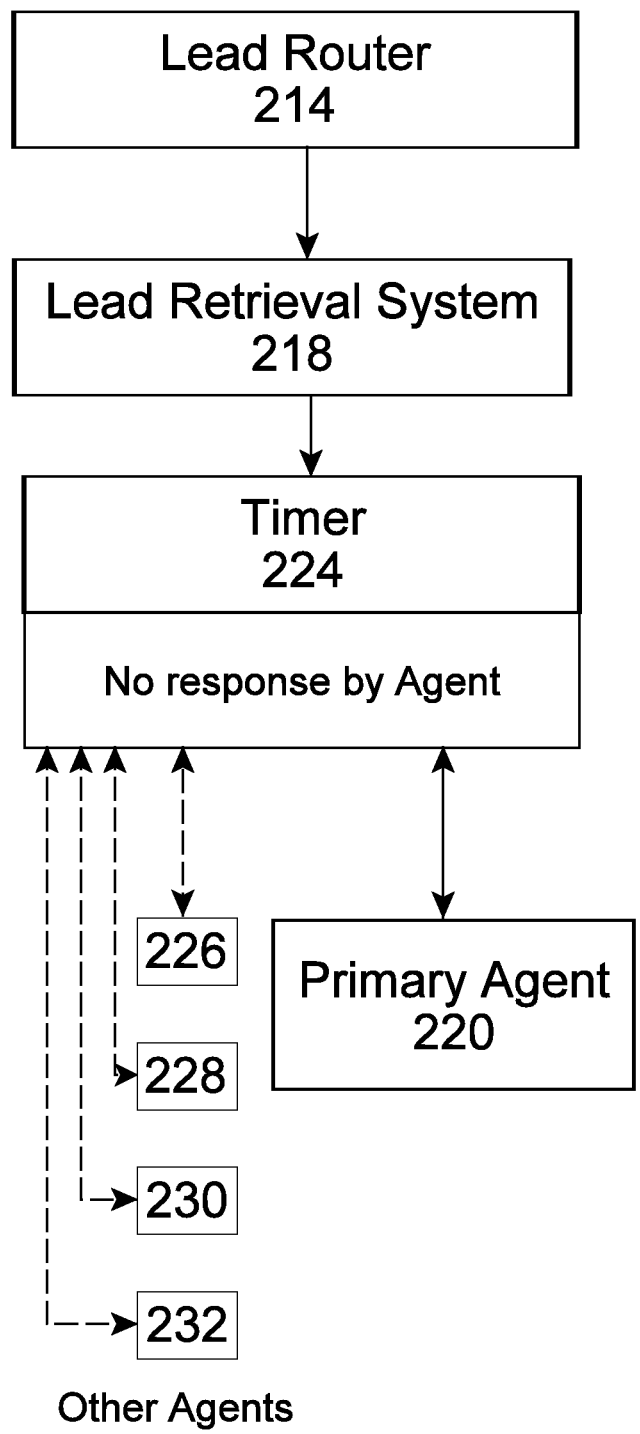
FIG. 7 is a flow chart showing yet another embodiment of how captured phone numbers can be forwarded to agents.
Figure 8:
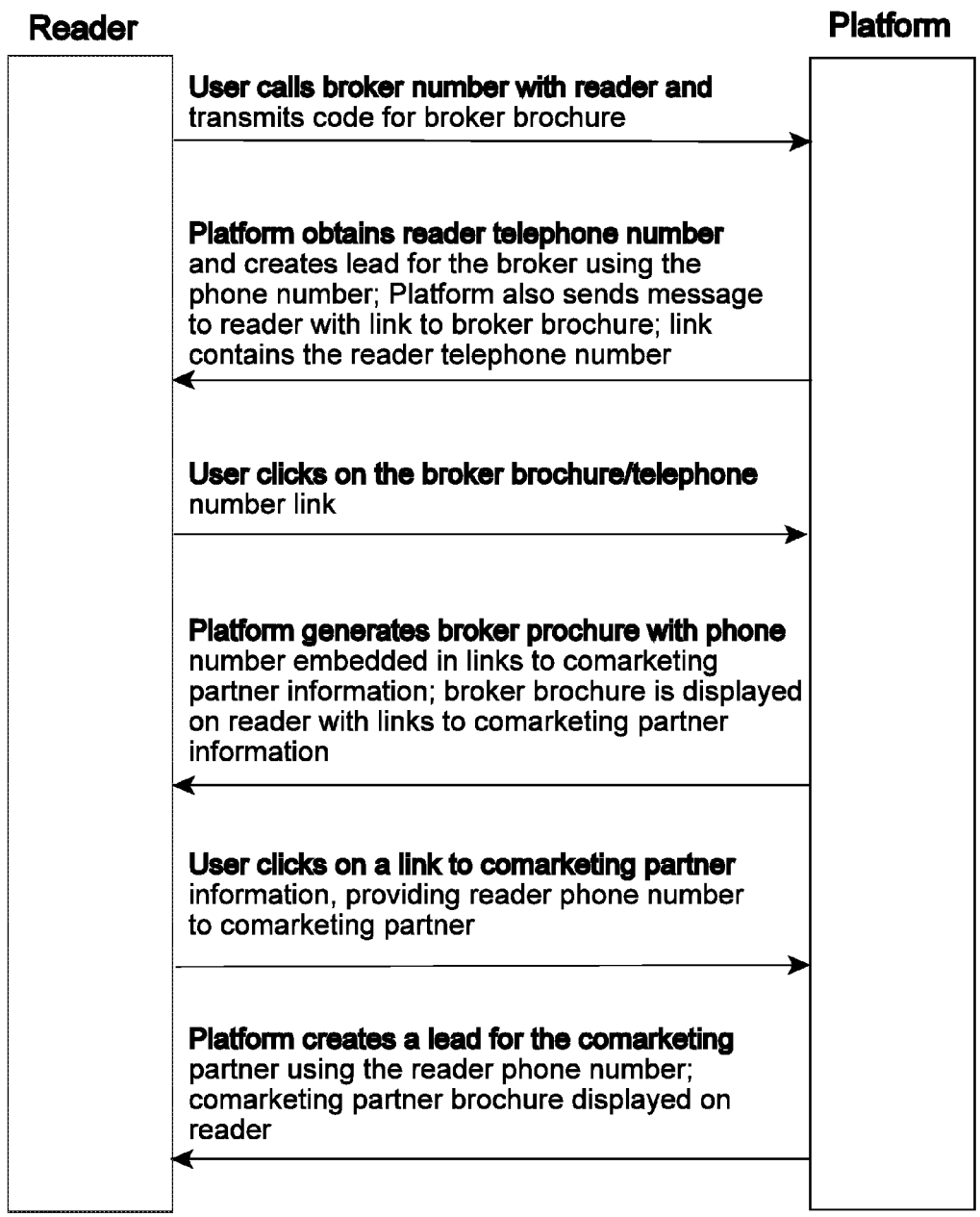
FIG. 8 is a schematic showing the process by which information can be exchanged sequentially between a reader and a platform, and other information can be forwarded to one or more agents.

Alternatively, as shown in FIG. 7, a call tree format could be set up with a list of additional agents 226, 228, 230, 232, etc., and the order in which they are to be contacted. Each sales agent 226, 228, 230, and 232 must respond within a predetermined time interval, or the lead goes to the next agent on the list.

Preferably, the timer 224 is programmable, with choices for how long agents have to respond and how the lead will be directed throughout the list of participating agents within the brokerage or company. This could be done with a user interface, possibly with a series of check boxes, a drop down box with multiple options, or an option for an agent to add his or her own sequence of timing. The response time before the next agent is contacted can be constant, or it can be set for each subsequent contact. For example, the primary agent 220 might be given 5 minutes to respond, the first two additional agents 226 and 228 might each be given 10 minutes to respond, and subsequent additional agents 230 and 232 might each be given 15 minutes to respond. The times may be determined and changed by a system administrator, such as a broker or sales manager. The order in which the additional agents are contacted may be determined on any basis, such as their levels of familiarity with the property or their previous response history. For example, an agent who doesn't respond within his or her allotted time could be placed at the bottom of the list of agents to receive the next lead opportunity. Preferably, the lead retrieval system 218 and/or timer 224 connect the agent directly with the phone number of the reader, such as via a transfer and release method. Thus, after an agent connects to the reader, the lead retrieval system 218 or timer 224 prevents all other agents from responding to the message.

The lead retrieval system 218 and/or timer 224 may also include the capability of tracking and reporting activities relating to the agents via activity tracker 222, the users/leads, and/or the items. For example, the lead information could be used to populate a customer's lead activity report, with the lead activity viewable by code or by date range. For real estate, this process mirrors the lead generation that happens when the prospect calls the toll free number on a sign rider and enters the property code.

The present invention also comprises a code generator for creating codes that provide multi-functional links between a user's reader and a provider's URL link associated with the code. These links may access any of the data ports provided on a reader. Once generated, a code may be assigned to a particular item and/or a particular provider.

The present invention facilitates a timely response from an agent when a code associated with an item is read. The text lead router functionality enables efficient management of leads received by capturing reader phone numbers, locations, etc., and prompt follow-up with those leads.

To assist in analytics and tracking, the initial text or email message sent by the lead handler may contain an additional link which opens a mobile web page to be completed by the agent to track call results and information about the user/lead. For example, in real estate, a broker (agent) may track when a lead or client is anticipating buying a property, whether they want additional information, whether a showing was scheduled, whether the lead/client is prequalified for a mortgage, or whether the lead/client wants to be connected with a lender, moving company, etc. These survey results could then be incorporated into a broker's CRM tool or tracking system. Also, the broker or sales manager may also have tracking available in their portal to the lead retrieval system to facilitate analysis of responses to leads, for example, who called the lead, what time the lead was called, sales agent response times, average call back times, and/or floor call effectiveness. Calls may also be recorded for use in training agents.

Some embodiments of the present invention include additional features and functions. For example, in addition to creating a lead containing the caller number as described above with reference to FIGS. 4-6, a URL link for a broker brochure containing additional information may be sent in a text message to the caller. U.S. Pat. No. 7,643,821, issued to Kenneth O'Hanlon on Jan. 5, 2010, and incorporated herein by reference in its entirety, describes a text brochure suitable for sending a variety of types of information to a reader. The brochure provided in the text message may include one or more additional URL links to web pages, such as, in the case of real estate, for information about services that might be of interest in relation to the property or for viewing pictures or information about other properties. These additional URL links may include the reader phone number, thereby providing the phone number to one or more parties associated with the additional URL links when the URL links are clicked.

If, for example, the additional URL links are to request information about other properties, and the user clicks on the corresponding URL links, an additional lead including the user's phone number may be sent to the agent handling whichever property URL link is clicked. For another example, the additional URL links may be to request information about services related to the first property, such as in comarketing arrangements with sources for mortage loans or desirable improvements or repairs to the property. In this case, if the user clicks on one of the URL links, another URL link or set of URL links for information about particular services from one comarketer can be sent to the user's device. If the user then clicks on such another URL link, in addition to displaying the requested information to the user, the phone number is included in a lead sent to the comarketer. The same lead router described above may be used to send leads to all of the recipients, or a separate lead router may be used to send each additional lead to its recipient.

The process of exchanging information between the user and the lead router has been described with respect to QR codes, ShotCodes, MobiTags, 2-dimensional bar codes, and 3-dimensional bar codes. In addition, it can be used with image recognition, using a downloadable application in the reader that can send an image, such as a photograph, to the multi-functional link and platform.

Example 1: lead routing to a broker based on a request for a real estate broker brochure
1. A user requests a broker brochure about the property by making a phone call; sending a text message; scanning a QR code, ShotCode, MobiTag, or bar code; or scanning an image of the property.
2. The incoming request is received, and an IVR interface collects the user's phone number. One suitable IVR interface is the Twilio Interface, described at http://www.twilio.com.
3. The requested broker brochure is sent to the user.
4. The user's phone number and information about the request are routed to a lead retrieval system.

Example 2: lead routing to a broker and a comarketing partner based on a request for a real estate broker brochure
1. A user requests a broker brochure about the property by making a phone call; sending a text message; scanning a QR code, ShotCode, MobiTag, or bar code; or scanning an image of the property.
2. The incoming request is received, and an IVR interface collects the user's phone number.
3. The requested broker brochure contains one or more URL links that allow the user to obtain additional information and is sent to the user, such as via an SMS-formatted text message. The URL links include the user's phone number.
4. The user's phone number and information about the request are routed to a lead retrieval system for the broker.
5. The user clicks on one of the broker brochure URL links to which his or her phone number is tied to request additional information. The URL link takes the user to a comarketer's brochure with additional URL links for information about the comarketer's products and/or services, with the additional URL links also containing the user's phone number. The comarketer's brochure may also be delivered via email.
6. The user clicks on one of the additional URL links in the comarketer's brochure and receives the desired product or service information.
7. The user's phone number and other information about the request are routed to a comarketer lead retrieval system.

It should be noted that the comarketer lead retrieval system may be part of the lead retrieval system in Example 1, such as with a programmable lead router, and/or the comarketer lead retrieval system may be independently programmable, and/or it may be a separate lead retrieval system managed by the comarketing partner. The process can be used with mutiple comarketing partners advertising in a single broker brochure and for a comarketing partner that advertises on many different broker brochures.

The foregoing description is considered as illustrative only of the principles of the invention. Further, since numerous modifications and changes will readily occur to those skilled in the art, it is not desired to limit the invention to the exact construction and process shown and described above. Accordingly, all suitable modifications and equivalents may be resorted to falling within the scope of the invention.

I claim:

1. A system for responding to codes, the codes selected from Quick Response (QR) codes, shotcodes, mobitags, 2-dimensional bar codes, 3-dimensional bar codes, and images;

said system comprising a platform operative to receive and send messages and to distribute information, said system operative to perform functions selected from:
  a) responding to codes scanned by a reader, the reader having multiple communication ports including a telephone port with an associated telephone number, wherein said system comprises:
    a code associated with an item and recognizable by the reader;
    a Universal Resource Locator (URL) associated with a provider of said code and item, wherein said URL is accessible via said code;
    a multifunctional link that is operative to interact with said URL and to open the telephone port and at least one additional communication port of the reader when said link is accessed by the reader;
    a platform that is operative to receive information from said communication ports, said information including the telephone number of the reader, said platform also being operative to transmit information to the reader; and
    a lead router that receives communications from said platform and routes said information to said provider, wherein said information includes the associated telephone number;
  b) associating telephone numbers with text transmissions, wherein said system comprises:
    means for receiving data simultaneously from a telephone port having an associated telephone number and a text port, both ports in a telecommunications device;
    means for transmitting data including said telephone number to said text port; and
    means for transmitting additional data including said telephone number to a tracking system; and
  c) communicating with an information sending/receiving device, said device having a camera and a unique user identification, wherein:
    said system comprises:
      means for receiving a message from the sending device and opening an URL,
      means for finding the unique user identification of the sending device,
      means for determining from the user identification the make and model of the sending device; and
      means for formatting messages for receipt by the sending device; and
    communicating with said information sending/receiving device comprises the steps of:
      opening a telephone port of the sending/receiving device to obtain a telephone number associated with the device; and
      tying the telephone number to the unique user identification; and
  d) combinations thereof.

2. The system of claim 1, comprising functions (a), wherein
said information transmitted to the reader comprises links to URLs that include the associated telephone number.

3. The system of claim 1, comprising functions (a), further comprising:
  a code generator operative to create said code;
  a code scanner having a unique identifier associated with the telephone number of the reader; and
  means for using said identifier to associate the telephone number with one or more features selected from links to URLs, text messages, Wireless Application Protocol (WAP) pages of the reader, and WAP locating functions of the reader.

4. The system of claim 3, wherein said scanner is downloadable to the reader and adapted for use with the particular type of reader for recognizing said code.

5. The system of claim 3, wherein said scanner is operative to retrieve information from images, said images selected from Quick Response (QR) codes, ShotCodes, MobiTags, 2-dimensional bar codes, 3-dimensional bar codes, photographic images, and video recordings.

6. The system of claim 1, comprising functions (a), comprising a plurality of lead routers for routing said information to a plurality of providers.

7. The system of claim 1, comprising functions (b), wherein said means for receiving data comprises a multifunctional link operative to keep said telephone port and said text port open simultaneously.

8. The system of claim 1, comprising functions (b), wherein said additional data comprises leads and said tracking system is a lead routing system.

9. The system of claim 1, comprising functions (b), wherein said system further comprises a database of information for transmittal to said text port.

10. A method for generating and tracking leads in response to scanned codes, said method comprising the steps of:
  a. providing a system comprising:
    a code associated with an item and recognizable by the reader;
    a Universal Resource Locator (URL) associated with a provider of said code and item, wherein said URL is accessible via said code;
    a multifunctional link that is operative to interact with said URL and to open the telephone port and at least one additional communication port of the reader when said link is accessed by the reader;
    a platform that is operative to receive information from said communication ports, said information including a telephone number of the reader, said platform also being operative to transmit information to the reader; and
    a lead router that receives communications from said platform and routes said information to said provider, wherein said information includes the associated telephone number;
  b. receiving a communication from the reader that opens said link and said URL;
  c. using said multifunctional link to open the telephone port and at least one additional communication port of the reader and to transmit information including the reader telephone number to said platform;
  d. using said platform to send return information to the reader, said return information including a link to an additional URL, said additional URL comprising the reader telephone number;
  e. receiving via said additional URL a user request transmitted by the reader for information about the item;
  f. automatically associating the reader telephone number with said request;
  g. sending said requested information to the reader; and
  h. routing said phone number and additional information about the request to a lead router.

11. The method of claim 10, wherein said requested information in step g is a text message.

12. The method of claim 10, wherein said requested information in step g comprises at least one link to a supplemental URL comprising the phone number of the reader, and said method further comprises the steps of:
- i. receiving a user selection from the reader of one of said links to a supplemental URL; and
- j. routing said phone number and information about the selection to a lead retrieval system.

13. The method of claim 12, wherein said lead router is different from said lead retrieval system of step j.

14. A system for handling a code associated with an item, said code including instructions for providing information about the item, said system comprising:
- means for receiving an image of said code from a data port of a sending/receiving device;
- means for scanning said image to obtain said instructions; and
- means for carrying out said instructions, said means comprising a multifunctional link operative to maintain multiple ports of the sending/receiving device open;
- wherein said instructions include the steps of:
- opening a telephone port of said sending/receiving device, said telephone port having an associated telephone number;
- associating the telephone number with information to be sent to the data port; and
- transmitting said information to the sending/receiving device.

15. The system of claim 14, wherein said means for scanning operates in the sending/receiving device.

16. The system of claim 15, wherein:
- said means for scanning is a downloadable software application specific for use with the sending/receiving device;
- said application is associated with an unique identifier; and
- said means for carrying out comprises means for associating said unique identifier with the telephone number and means for using said unique identifier and the telephone number for formatting said information for the sending/receiving device.

17. The system of claim 14, wherein said code is selected from Quick Response (QR) codes, ShotCodes, MobiTags, 2-dimensional bar codes, 3-dimensional bar codes, images, video, and combinations thereof.

18. The system of claim 14, wherein said means for carrying out instructions comprises a platform operative to associate the telephone number with said data information.

19. The system of claim 14, wherein said means for carrying out instructions is operative to send messages including the telephone number to a message router.

* * * * *